United States Patent [19]

Faulconer

[11] 4,095,399
[45] Jun. 20, 1978

[54] FRUIT PICKER

[76] Inventor: Richard J. Faulconer, P.O. Box 164, Barstow, Calif. 92311

[21] Appl. No.: 756,178

[22] Filed: Mar. 3, 1977

[51] Int. Cl.² .......................................... A01D 46/24
[52] U.S. Cl. ..................................................... 56/336
[58] Field of Search .................................. 56/332–336

[56] References Cited

U.S. PATENT DOCUMENTS

| | | | |
|---|---|---|---|
| 1,158,158 | 10/1915 | Angeski | 56/334 |
| 1,187,214 | 6/1916 | Wible | 56/334 |
| 2,661,587 | 12/1953 | Bullock | 56/334 |
| 2,746,232 | 5/1956 | Ossino | 56/336 |
| 2,925,701 | 2/1960 | Fitzgerald | 56/336 |

*Primary Examiner*—Russell R. Kinsey

[57] ABSTRACT

A hand-held fruit picker comprises an elongated, rigid tube which has one open inlet end and an outlet end closed by a spring-biased, pivotally movable cover. A pair of knives are mounted adjacent the inlet end of the tube. In the rest position the knives are disposed at an angle relative to each other. To detach fruit, one of the knives is pivoted to close with the other knife, thereby severing the fruit stem. The fruit drops into the tube where it is stored until it is discharged through the outlet end after the cover has been removed therefrom. A pair of handles are attached to the exterior of the tube: one handle includes a lever for actuating the movement of the pivotable knife, and the other handle includes a lever for actuating the movement of the cover from the closed to the open position of the outlet end. Force transmitting means convert the action of one lever into a movement of the knife, and the action of the other lever into a movement of the cover. The return of the knife to its rest position, and the replacement of the cover as a closure of the outlet end are effected through the medium of spring forces.

16 Claims, 6 Drawing Figures

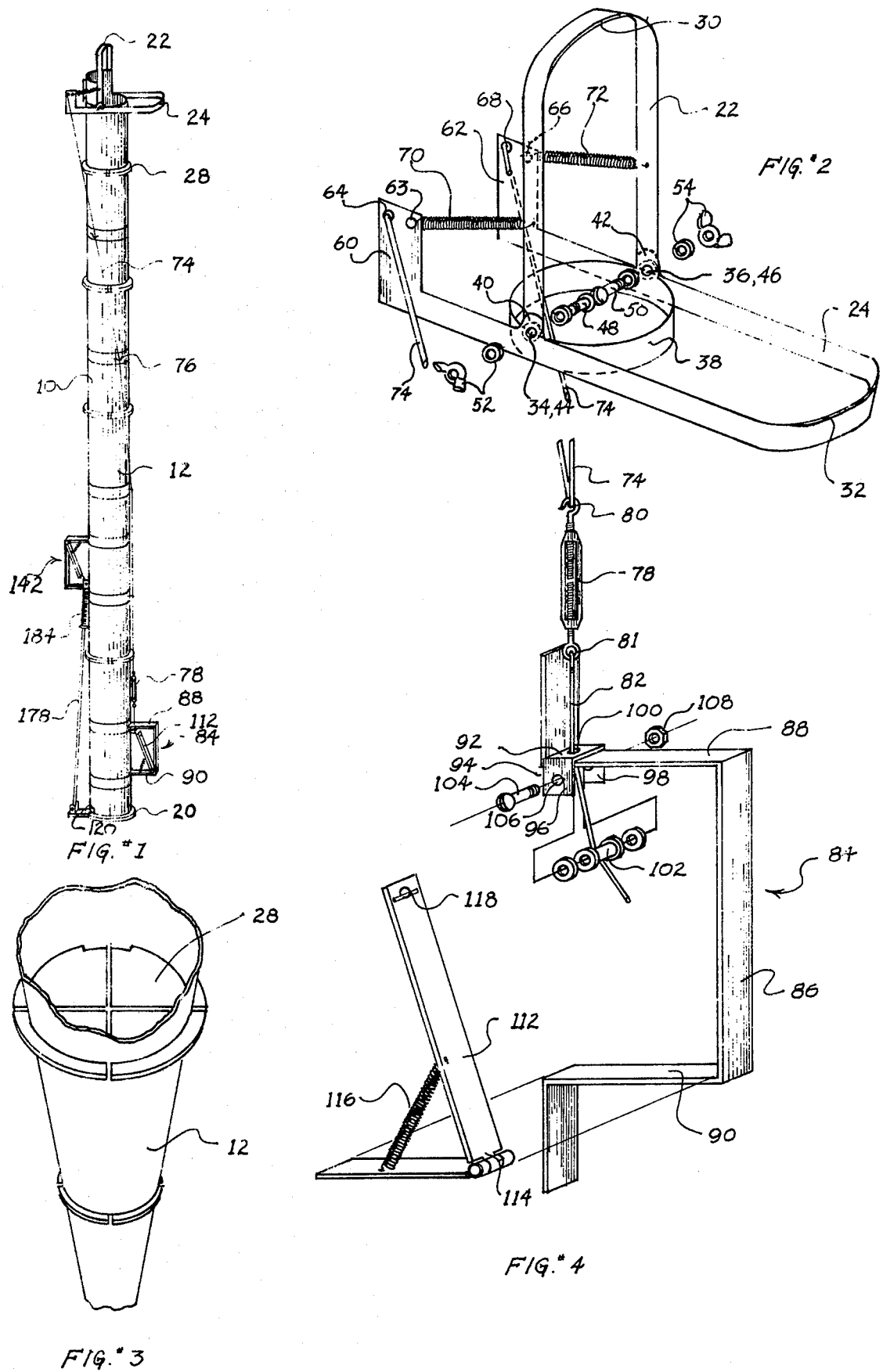

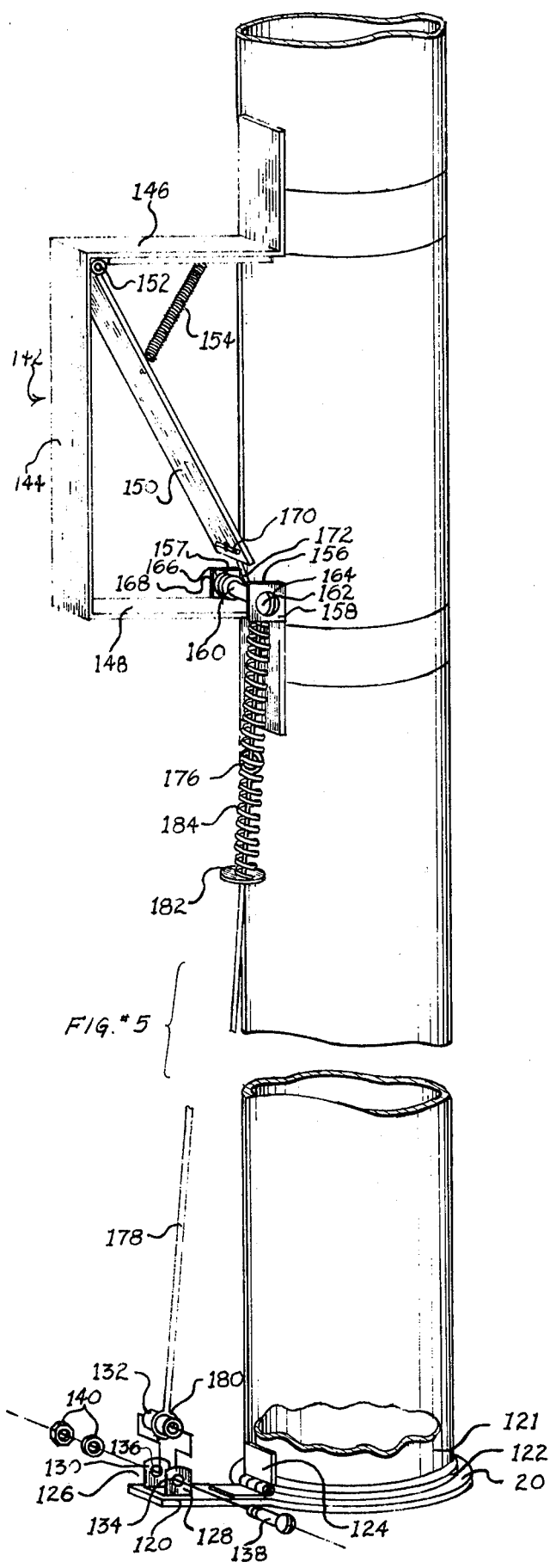
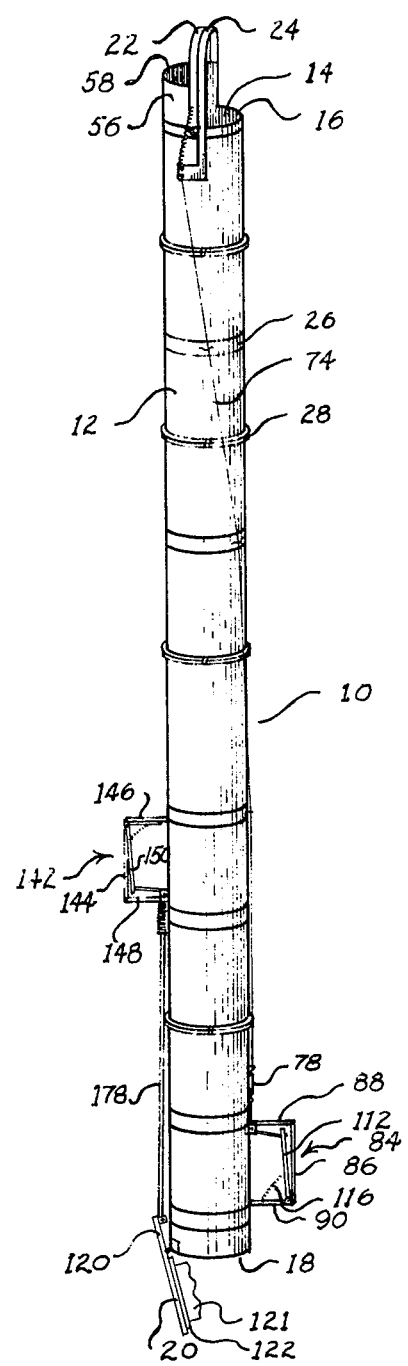
FIG. 5
FIG. 6

FRUIT PICKER

FIELD OF THE INVENTION

The field of art to which the invention pertains includes the field of fruit pickers and, more specially, of hand-held fruit pickers mounted on the end of an elongated member, for detaching fruit which cannot be easily reached by hand, in combination with means for catching the severed fruit and storing it before discharging it into larger collection receptacles. References of interest include U.S. Pat. Nos. 64,472, 296,514, 351,824, 1,223,601, 2,406,055 and 3,559,387.

BACKGROUND AND SUMMARY OF THE INVENTION.

The labor-intensive features inherent in fruit-picking operations by means of a hand-held fruit picker make it desirable to provide an apparatus which maximizes the operator's productivity while minimizing damage to the fruit as well as to the fruit trees. These requirements are only inadequately met in prior art. A number of conventional hand-held fruit pickers do not provide receptacles for the newly picked fruit; once it has been detached from the tree, the fruit is made to fall to the ground at the risk of being bruised or squashed in the process. Other prior art fruit pickers include receptacles which depend from a pole on which fruit-detaching means are mounted. The uneven weight distribution caused by the presence of fruit in such receptacles makes it difficult for the operator to balance the pole, particularly in the dense foliage typical of many fruit trees. Another drawback is that such receptacles can be emptied only by pouring or lifting the fruit therefrom, which is time consuming and, moreover, involves considerable stooping and bending.

The present invention intends to overcome the limitations of prior art by providing a simple, light-weight fruit picker which is easy to operate and which can be produced at a price that the small-orchard owner can afford to pay. Accordingly, a hand-held fruit picker is disclosed which comprises a rigid, elongated tube, with one inlet end and one outlet end, of which the outlet end is closed or sealed by a spring-biased pivotally movable cover. A pair of spring-biased knives are secured adjacent to the open inlet end of the tube at an angle relative to each other.

One of the knives is pivotable to advance toward, and away from, the other of the knives which is fixedly attached to the tube. During the advancing movement, the cutting edges of the two knives close over the fruit to detach it from the tree. The attitude of the knives with respect to the open end of the tube is such that the detached fruit drops into the bore defined by the tube, in which its descent is decelerated by air baffles or vanes attached to the inner wall of the tube. A layer of cushioning material is deposited on the interior surface of the cover at the closed tube end, to absorb the impact of the fruit falling through the bore.

In a preferred embodiment, a portion of the tube continues as a longitudinal extension beyond the open tube end. The semi-cylindrical wall thus formed serves as a backstop for fruit held between the knives. The concave surface of the backstop is lined with foam rubber or a similar cushioning material to protect the fruit against bruising.

One handle is attached to a portion of the tube wall proximate its closed end; a second handle is attached to a portion of the tube wall at an opposite location from the first handle, and distal from the closed end. The handle proximate the closed end includes a first pivotable lever which is operatively connected with the pivotable knife adjacent the inlet end of the tube. The handle distal from the open end includes a second pivotable lever which is operatively connected with the pivotable cover. Each of the levers is biased at an angle with respect to the handles by a coil spring mounted between a portion of the lever and a portion of the handle. The levers are spaced from the handles on which they are mounted by a distance such that the handle and the lever thereon may be gripped in one hand and the lever squeezed toward the handle.

The manipulation of the first lever results in the advance of the pivotable knife toward the fixed knife. The release of the squeeze, and the subsequent retraction of the extension coil spring, restores the lever in its previous position and thereby effects the retraction of the knife from its engagement with the fixed knife. The manipulation of the second lever causes the cover to swing away from the closed end of the tube, to permit discharge of the fruit therethrough. The release of the squeeze and the subsequent return of the second lever to its previous position causes the cover to snap back to its closing or sealing position.

The first lever and the pivotable knife are connected to one another by flexibe rope means, including a turnbuckle which is adapted to adjust the rope tension. The means connecting the second lever and the cover include a flexible rope attached to a rigid rod. A coil spring located between the second lever and a spring seat provided on the rod maintains the cover in the closing or sealing position unless it is displaced therefrom by a movement of the second lever. Upon release of the lever the cover is urged toward a closing or sealing position by expansion of the compressed spring.

The design of the tube, the placement of the handles with respect to the tube wall, and the placement of the knives with respect to the open end of the tube, facilitate the operational orientation of the tube at an angle with respect to the stance of the operator on the ground. This has the advantage of aligning the direction in which the tube is pointed with the operator's line of vision during the fruit picking process, and prevents fatigue due to neck twisting and craning. Other advantages of the present invention, both as to its construction and mode of operation, will be readily appreciated as the same becomes better understood by reference to the following detailed description when considered in connection with the accompanying drawings in which like reference numerals designate like parts throughout the figures.

BRIEF DESCRIPTION OF THE DRAWINGS

FIG. 1 is a perspective view of a fruit picker in accordance with the present invention.

FIG. 2 is an exploded perspective view of a detail shown in FIG. 1.

FIG. 3 is a fragmentary perspective view of another detail shown in FIG. 1.

FIG. 4 is an exploded perspective view of yet another detail shown in FIG. 1

FIG. 5 is a perspective, exploded view of a further detail shown in FIG. 1.

FIG. 6 is a perspective view of the fruit picker of FIG. 1 in the actuated position.

DETAILED DESCRIPTION

As required, a detailed illustrative embodiment of the invention is disclosed herein. However, it is to be understood that the embodiment merely exemplifies the invention which may take forms that are different from the specific illustrated embodiment disclosed. Therefore, specific structural and functional details are not to be interpreted as necessarily limiting, but as a basis for the claims which define the scope of the invention.

Referring to FIGS. 1 and 6, there is shown a handheld fruit picker 10, comprising an elongated tube 12 defining an axial bore 14 therethrough. The inlet end 16 of the tube 12 is open, and the opposite end, forming an outlet 18 is closed by a removable cover 20. A pair of coacting knives, 22 and 24 respectively, are secured to the tube 12 adjacent the end 16. The knife 22 is fixedly attached to the tube 12, and the knife 24 is pivotally movable with respect to the knife 22. The tube 12 is a rigid member, preferably made of lightweight plastic material, and may be made of any convenient length and diameter, depending on the height of specific fruit trees and the size of specific fruit. In a preferred embodiment the diameter of the tube is slightly larger than that of the fruit, so that the fruit, admitted through the inlet 16, is stored in stacked relation, one on top of the other. This arrangement minimizes the areas of contact between individual pieces and reduces the susceptibility to bruising and squashing.

The tube 12 is reinforced by annular bands 26 which snugly surround its exterior wall, in spaced relation with one another.

A plurality of air baffles or vanes 28 (FIG. 3), made of flexible material such as rubber, are attached to the interior tube wall facing the bore 14, to slow the descent of the fruit through the tube.

Each of the knives 22,24 is formed as a substantially U-shaped band, with a cutting edge 30,32 respectively, in the bight of the U. The legs of the knife 22, each including an opening 34,36 respectively, are integrally formed with, and project from, opposite sides of an annular band 38 at right angles thereto. The band 38 is fitted around the tube 12, so that the upper edge of the band is flush with the upper edge of the tube at the inlet 16, and the knife 22, arching over the bore 14, is parallel with the longitudinal axis of the tube.

The legs of the knife 24 each comprise an arcuate ear, 40 and 42 respectively, each of which has a central opening 44, 46. The openings 44 and 46 are concentrically aligned with the openings 34 and 36 respectively and with openings (not shown) provided in the tube wall, in order to position the knife 24 with respect to the knife 22. Bolts 48, respectively 50, serving as pivot pins, are admitted through the respective superposed groups of openings and secured against displacement by conventional fastening means 52, respectively 54.

A portion of the tube 12 is continued beyond the inlet end 16 as an arcuate wall 56 (FIG. 6) which is defined laterally by the legs of the knife 22, and whose height is less than the height of the knife. The wall 56 forms a backstop for fruit during the cutting operation, from which it is gently directed into the bore 14. In a preferred embodiment a padding 58 of resilient material, such as foam rubber or the like, is affixed as by glue to the surface of the wall 56 facing the bore 14.

Each of the legs of the knife 24 terminates in a flange 60,62 which includes a pair of openings denoted by the numerals 63,64 and 66,68 respectively. The opening 63 anchors therein one end of a spring coil 70 which, at its opposite end, is affixed to one leg of the knife 22. The opening 66 anchors therein one end of a spring coil 72 which, at its opposite end, is affixed to the other leg of the knife 22. The spring coils 70 and 72 are tensioned so as to maintain the knives 22 and 24 at an angle of approximately 90° with respect to one another in the non-actuated state. A rope 74, made of wire of fibers such as nylon, is attached at one of its ends to the opening 64 and at the other of its ends to the opening 68 in the flanges 60, respectively 62. The rope 74 thus forms a loop which is threaded through guides 76 provided on the outside of the tube 12, and passed underneath a hook 80 affixed to one end of a turnbuckle 78. At its opposite end the turnbuckle 78 includes a ring 81 through which a second wire or fiber rope 82 is passed.

A U-shaped rectangular handle 84 comprises a center portion 86 and a pair of arms denoted by the numerals 88 and 90. The handle 84 is mounted on the exterior of the tube 12 proximate the outlet end 18, so that the center portion 86 is parallel with the tube axis. A U-shaped rectangular bracket 94 has a center panel 92 disposed on and parallel with the handle arm 88, and side panels 96, respectively 98, which depend therefrom. The center panel 92 includes a central opening 100, which is concentric with another opening (not shown) in the arm 88. A hollow, cylindrical roller 102 is rotatably mounted between the side panels 96 and 98 by a bolt 104 which is admitted through an opening 106 in the panel 96, passed through the interior of the roller, and further, through an opening (not shown) in the panel 98. The bolt 104 is secured against displacement by conventional threaded means 108.

A lever 112 comprises two arms which are connected to each other by hinge means 114. One arm of the lever 112 is affixed to the handle arm 90 and parallel therewith, by an arc weld, whereas the other arm is pivotable about the hinge means 114. In the non-actuated position the pivotable arm is held at an angle relative to the fixed arm by a coil spring 116 whose opposite ends are secured to facing portions of the two lever arms. The properties of the coil spring 116 are predetermined, so as to space the pivotable arm of the lever 112 from the center portion 86 of the handle 84 by a distance such that both may be gripped with one hand, and the lever arm squeezed against the handle.

A bar or a similar protrusion 118 is affixed to the free end of the pivotable arm of the lever 112.

The rope 82, suspended in the turnbuckle ring 81, is passed through the opening 100 in the center panel 92 of the bracket 94 and the concentric opening in the handle arm 88 and guided past the friction-reducing roller 102. The ends of the rope 82 are fastened to the bar 118 on the pivotable lever arm.

The cover 20, disposed at the outlet end 18 of the tube 12, is formed as a paddle which has a round portion with a diameter larger than the tube diameter, and an integrally formed arm 120, coextensive therewith. The surface of the cover 20 proximate the bore 14 supports thereon a deposit of resilient material 121 which may be foam rubber or the like. A sealing ring 122, made of elastomeric material such as rubber, encompasses the tube 12 at its end proximate the cover 20, to prevent air from entering the tube when the cover is in the closing position.

Hinge means 124, joined to one end of the substantially rectangular arm 120 and a portion of the proximate tube wall respectively, permit pivotal movement of the cover 20. At its end distal from the hinge means 124, the arm 120 supports the center panel of a U-shaped rectangular bracket 126 whose side panels 128 and 130 extend therefrom in the direction of the inlet end 16 of the tube 12. A cylindrical hollow roller 132 is aligned with the panels 128 and 130, so that a pair of facing openings 134 and 136 provided in the panels, are concentrically aligned with the roller bore. A bolt 138, passed through the opening 134, through the interior of the roller 132 and egressing through the opening 136, serves to rotatably mount the roller normal to the tube axis. The bolt 138 is secured against displacement by conventional threaded means 140.

A handle 142 which is identical with the handle 84, is secured to the exterior of the tube 12 at a diametrically opposite position relative to the handle 84, and spaced away from the outlet end 18. The handles 84 and 142 serve as handholds for carrying the tube. The handle 142 comprises a center portion 144 and a pair of arms 146 and 148.

A lever 150, corresponding to the lever 112, comprises two arms which are connected to each other by hinge means 152. One arm of the lever 150 is affixed to the underside of the handle arm 146 and parallel therewith, whereas the other arm is pivotable about the hinge means 152. In the non-actuated position the pivotable arm is held at an angle relative to the fixed arm by a coil spring 154 whose opposite ends are secured to facing portions of the two lever arms. The properties of the coil spring 154 are predetermined, so as to space the pivotable arm of the lever 150 from the center portion 144 of the handle 142 by a distance such that both may be gripped with one hand, and the lever arm squeezed against the handle. A U-shaped rectangular bracket 156 includes a center panel (not shown), disposed on the underside of the handle arm 148 and parallel therewith, and a pair of side panels 157 and 158 respectively, extending in the direction of the inlet end 16 of the tube 12. Each of the panels 157 and 158 includes a central opening 166, 164 respectively. A hollow cylindrical roller 160 is rotatably mounted between the panels 157 and 158, normal to the tube axis, on a bolt 162 which is passed through the opening 164 in the panel 158, the interior of the roller, and through the opening 166 in the panel 157. The bolt 162 is secured against displacement by conventional means 168.

A bar or a similar protrusion 170 is affixed to the free end of the pivotable arm of the lever 150 and serves to tie thereon the opposite ends of a wire or fiber rope 172. The rope 172 which at its midpoint passes through a ring 176, depends from the bar 170 as a loop which is guided past the friction-reducing roller 160, and through a pair of concentric openings (not shown) provided in the arm 148 of the handle 142 and the center panel of the bracket 156 therebelow. The ring 176 is mounted on one end of a rod 178 which depends from the rope 172 in substantially parallel alignment with the axis of the tube 12. At its opposite end, the rod 178 includes a second ring 180 which coaxially surrounds the cylindrical roller 132.

A disc 182 is coaxially mounted on a portion of the rod 178 intermediate the two rings 176 and 180 and forms a seat for one end of a compression spring 184. At its opposite end, the spring 184 is attached to the underside of the handle arm 148.

In practice, an operator, carrying the fruit picker with both hands by the handles 84 and 142, will squeeze the lever 112 more frequently than the lever 150. The lever 112 whose pivotable arm swings clockwise in an arcuate movement between the tube wall and the center portion 86 of the handle 84 upon squeezing, thereby exerts a pull on the rope 74, respectively on the knife 24 to which the rope is connected, and causes the knife 24 to close with the knife 22. Upon release of lever 112 the knives are separated and restored to their rest position by the extended springs 70 and 72.

The lever 150 whose pivotable arm swings clockwise in an arcuate movement between the tube wall and the center portion 144 of the handle 142 upon squeezing, pulls the rope 172, the rod 178 connected thereto, and the cylindrical roller 132 on the cover arm 120 in an upward direction. The pull causes the cover 20 to pivot, against the spring force 184, away from the outlet end 18 of the tube 12. In this way, the manipulation of the lever 150 permits the effortless discharge of fruit stored in the tube 12 into larger receptacles on the ground. Upon release of lever 150 the cover 20 is restored to its closing position by the expansion of the compressed spring 184.

The disposition of the knives, the placement of the handles and the attitude of the levers are all designed to facilitate the operation of the fruit picker held at an angle with respect to the stance of an operator on the ground. When the tube is pointed upward into a tree in a slanted direction, the operator can easily coordinate his line of vision with the orientation of the fruit picker. Simultaneously, the fruit, supported, during and immediately after the cutting operation, on the cushioned surface of the arcuate wall extending beyond the inlet end of the tube, is gently guided into a slanted storage tube prior to its discharge through the outlet end.

I claim:

1. A fruit picker comprising
an elongated tubular member defining a bore therethrough, and having an inlet and an outlet at opposite ends thereof;
a first handle and a secnd handle spaced from each other, affixed to the exterior of said tubular member;
cutting means secured to said tubular member adjacent said inlet, comprising a first knife fixedly mounted on said tubular member, and a second knife pivotally connected to said tubular member and said first knife, and movable between a first position angularly spaced from said first knife, and a second position juxtaposed therewith;
means for moving said second knife between said first and said second position, said means comprising a first lever mounted on said first handle and spaced therefrom a distance such that said handle and said lever may be gripped in one hand and the lever squeezed toward said handle, force transmitting means connecting said first lever and said second knife, and spring means disposed between said first knife and said second knife;
said fruit picker further comprising a cover member pivotally mounted on said tubular member adjacent said outlet and movable between a first position closing said outlet, and a second position opening said outlet for the discharge of fruit therethrough, means for moving said cover between said first and said second position, said means comprising a second lever mounted on said second handle and spaced therefrom a distance such that said handle and said lever may be gripped in one hand and the lever squeezed toward said handle, force transmitting means connecting said second lever and said cover, and spring means operatively engaging said force transmitting means intermediate said second lever and said cover.

2. The fruit picker according to claim 1 wherein said first knife is substantially U-shaped, arching over said inlet and having ends attached to opposite sides thereof in parallel alignment with the axis of said tubular member, and wherein said second knife is a substantially U-shaped band, said first and said second knife each having a cutting edge formed in the bight of the U.

3. The fruit picker according to claim 1 wherein said first knife and said second knife in said first position are disposed at a substantially right angle with respect to each other.

4. The fruit picker according to claim 1 wherein said levers are pivotable arms attached to said handles.

5. The fruit picker according to claim 1 comprising means for spring-loading said levers to a position spaced angularly with respect to said handles.

6. The fruit picker according to claim 1 comprising a plurality of annular bands tightly fitted around said tubular member in spaced relation to each other.

7. The fruit picker according to claim 1 comprising a plurality of flexible baffle members disposed in the interior of said tubular member surrounding said bore.

8. The fruit picker according to claim 1 wherein a layer of resilient material is fixedly attached to said cover member on its surface proximate said bore.

9. The fruit picker according to claim 1 comprising a sealing means between said tubular member and said cover, said sealing means comprising an annular member made of elastomeric material and disposed on said tubular member at said outlet, abutting against said cover.

10. The fruit picker according to claim 1 wherein said force transmitting means connecting said first lever and said second knife comprise a first rope attched to said second knife, and a second rope attached to said first lever, and a turnbuckle joining said first and said second rope for adjusting the tension in said ropes.

11. The fruit picker according to claim 1 wherein said force transmitting means connecting said second lever and said cover comprise a rope attached to said second lever, and a rigid elongated member joined at one of its ends to said rope and operatively connected at the other of its ends to said cover.

12. The fruit picker according to claim 1 wherein said first handle is proximal to said outlet and said second handle is distal therefrom 13. The fruit picker according to claim 1 wherein said first handle and said second handle are disposed at opposite sides of said tubular member.

14. The fruit picker according to claim 1 wherein said tubular member is a rigid cylinder made of lightweight material.

15. The fruit picker according to claim 2 comprising an arcuate wall extending continuously with said tubular member beyond said inlet and having lateral ends flush with the ends of said first knife, and a height which is less than the height of said knife.

16. The fruit picker according to claim 15 wherein resilient material is fixedly deposited on the surface of said wall facing said bore.

* * * * *